US012091900B2

(12) United States Patent
Schödel

(10) Patent No.: US 12,091,900 B2
(45) Date of Patent: Sep. 17, 2024

(54) METHOD FOR THE OPERATION OF A MOTORIZED FLAP ARRANGEMENT OF A MOTOR VEHICLE

(71) Applicant: Brose Fahrzeugteile SE & Co. Kommanditgesellschaft, Bamberg, Bamberg (DE)

(72) Inventor: Sebastian Schödel, Eckersdorf (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 572 days.

(21) Appl. No.: 17/271,707

(22) PCT Filed: Aug. 28, 2019

(86) PCT No.: PCT/EP2019/072956
§ 371 (c)(1),
(2) Date: Feb. 26, 2021

(87) PCT Pub. No.: WO2020/043773
PCT Pub. Date: Mar. 5, 2020

(65) Prior Publication Data

US 2021/0317698 A1 Oct. 14, 2021

(30) Foreign Application Priority Data

Aug. 31, 2018 (DE) ..................... 10 2018 121 346.8

(51) Int. Cl.

| | |
|---|---|
| ***E05F 15/73*** | (2015.01) |
| *E05F 15/75* | (2015.01) |
| *E05F 15/76* | (2015.01) |

(52) U.S. Cl.
CPC .............. *E05F 15/73* (2015.01); *E05F 15/75* (2015.01); *E05F 15/76* (2015.01); *E05Y 2400/44* (2013.01); *E05Y 2900/546* (2013.01)

(58) Field of Classification Search
CPC . E05F 15/73; E05F 15/75; E05F 15/76; E05F 15/622; E05Y 2400/44;
(Continued)

(56) References Cited

U.S. PATENT DOCUMENTS

2005/0168322 A1* 8/2005 Appenrodt ......... G07C 9/00309 340/5.72
2012/0290177 A1* 11/2012 Wagenhuber ........... E05F 15/77 701/49
(Continued)

FOREIGN PATENT DOCUMENTS

DE 102007062473 A1 * 7/2009 .............. B60J 5/047
DE 102009032956 A1 1/2011
(Continued)

*Primary Examiner* — Jaime Figueroa
*Assistant Examiner* — Benjamin J Brosh
(74) *Attorney, Agent, or Firm* — Dickinson Wright PLLC

(57) ABSTRACT

A method for the operation of a motorized flap arrangement of a motor vehicle. The flap arrangement including an adjustable flap, a drive assembly configured to adjust the flap, and a control arrangement for controlling the drive assembly. The control arrangement configured to detect an actuation action manually introduced to the flap in the form of an actuating movement and/or an actuating load and in response thereto, control the drive assembly and perform a plausibility check, in which an environment sensor of the motor vehicle, configured to detect an object in the vicinity of the motor vehicle, is checked by the control arrangement for the fulfilment of at least one plausibility criterion.

18 Claims, 2 Drawing Sheets

(58) Field of Classification Search
CPC ......... E05Y 2900/546; E05Y 2400/504; E05Y 2400/508; E05Y 2400/852; E05Y 2800/113
See application file for complete search history.

(56) References Cited

U.S. PATENT DOCUMENTS

| | | | | |
|---|---|---|---|---|
| 2014/0136024 | A1* | 5/2014 | Herthan | B60R 25/2054 701/2 |
| 2017/0030737 | A1* | 2/2017 | Elie | E05F 15/78 |
| 2018/0216867 | A1* | 8/2018 | Mynderse | F25C 5/22 |
| 2019/0032391 | A1* | 1/2019 | Lavoie | B60R 25/241 |

FOREIGN PATENT DOCUMENTS

| | | | |
|---|---|---|---|
| DE | 102009035321 | A1 | 3/2011 |
| DE | 102010037577 | A1 | 3/2012 |
| DE | 102011107279 | A1 | 1/2013 |
| DE | 102011118353 | A1 | 5/2013 |
| DE | 102015111568 | A1 | 1/2017 |
| DE | 202017100923 | U1 * | 4/2017 |
| EP | 1841069 | A1 | 10/2007 |
| EP | 2698649 | A1 | 2/2014 |

* cited by examiner $$a_G = \frac{V_G}{\Delta t_G} \qquad a_G' = \frac{V_G}{\Delta t_G'}$$

METHOD FOR THE OPERATION OF A MOTORIZED FLAP ARRANGEMENT OF A MOTOR VEHICLE

CROSS-REFERENCE TO RELATED APPLICATIONS

This application is the U.S. National Phase of PCT Application No. PCT/EP2019/072956 filed Aug. 28, 2019, which claims priority to German Patent Application No. DE 10 2018 121 346.8 filed Aug. 31, 2018, the disclosures of which are hereby incorporated in their entirety by reference herein.

TECHNICAL FIELD

The present disclosure relates to a method of operating a motorized flap arrangement of a motor vehicle.

BACKGROUND

The flap arrangement in question has a flap that can be adjusted by flap kinematics, which may be, for example, a tailgate, a trunk lid, or the like. The flap is assigned a drive arrangement, which is used for the motorized adjustment of the flap. A control arrangement is used for the control of the drive arrangement, in that a manual actuation action of the operator is converted into a motorized adjustment of the flap.

SUMMARY

The invention is based on the problem of designing and furthering the known method in such a way that the probability of incorrect control of the drive assembly is reduced by simple means.

Manual actuation action generally requires an operator touching the flap and in turn, the presence of the operator in the vicinity of the motor vehicle, such as near the flap. According to one or more embodiments, the present disclosure provides a plausibility check, which is directed to the detection of an object, such as the operator, in the vicinity of the vehicle, such as the flap, may drastically reduce incorrect control of the drive arrangement.

As an example, the plausibility check may include receiving signals from environment sensor of the motor vehicle, which is used for the detection of an object, such as an operator, in the vicinity of the motor vehicle, such as in the vicinity of the flap, is checked for the fulfilment of at least one plausibility criterion. Only when the plausibility criterion is met does the control arrangement trigger the motorized displacement of the flap by corresponding control of the drive arrangement.

The proposed solution can be implemented in a simple way, since the detection of the operator in the vicinity of the motor vehicle, such as of the flap, is not problematic from a control point of view. In this case, recourse may be made to an environment sensor system, which may be provided anyway depending on the equipment of the vehicle.

In another embodiment, the position of the operator in the vicinity of the motor vehicle, such as of the flap, can be detected by means of the environment sensor system. This variant places comparatively low requirements on the evaluation of the sensor signals of the environment sensor system, since only static information regarding the position of the operator is included in the evaluation.

Further safety with regard to the avoidance of incorrect control of the drive assembly results in that in the context of the plausibility check it is checked whether there is a predetermined movement of an object, such as of the operator. For example, it can be checked in this context whether the operator has approached the flap before the predetermined actuation action has been detected. Incorrect control of the drive assembly can be almost ruled out with this additional check.

In one or more embodiments, a definition of the predetermined actuation action by at least one actuating parameter, which may be a threshold value is provided. The detection of the actuation action then relies on the check of whether the respective actuation parameters or actuation parameter ranges are reached or not. With this type of mapping of the predetermined actuation action, a high degree of flexibility in control technology can be achieved since the actuation parameters are easily modifiable and/or exchangeable.

In another embodiment, a motion sensor assigned to the flap and/or the drive assembly is provided in a first variant, by means of the sensor signal of which the predetermined manual actuation action is detected. With this, a high level of accuracy in the detection of the actuation action can be achieved with a suitable implementation of the motion sensor. Alternatively or additionally, an electric drive current associated with the drive assembly is detected. This can be the drive current flowing through a drive motor of the drive arrangement. Such a detection of the drive current basically enables a sensorless and thus cost-effective detection of the predetermined actuation action. Further alternatively or additionally, the actuation action can also be detected by the control arrangement based on a drive voltage associated with the drive arrangement, such as a generator voltage. With this too, sensorless and thus cost-effective detection of the predetermined actuation action is possible.

Some embodiments concern advantageous variants for the conversion of the environment sensor system, which is used for the plausibility check. As an example, the double use of the environment sensor system as claimed in claim 11 leads to a particularly compact and at the same time low-cost construction of the flap arrangement as a whole.

In another embodiment, implementation of a learning routine in which a change of at least one actuation parameter is made depending on the respective result of the plausibility check over a predetermined number of recorded actuation actions, is provided. In the exemplary case that the result of the plausibility check over the number of recorded actuation actions is negative with a high frequency, the definition of the actuation action is obviously not practical, so that a suitable adjustment of the at least one actuation parameter is made. Such a learning routine ensures that actually present actuation actions are reliably detected and that faulty detection of actuation actions which are actually not present is further avoided.

The aforementioned control arrangement, which is set up for the implementation of the proposed method, is provided. Reference may be made to all the comments on the proposed method.

According to another embodiment, the above flap arrangement, configured to execute the one or more methods provided above, is disclosed.

BRIEF DESCRIPTION OF THE DRAWINGS

The invention is explained in more detail below on the basis of a drawing representing only one exemplary embodiment. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known method for the operation of a motorized flap arrangement is provided in DE 10 2009 035 321 A1, where the operator's manual actuation action is an actuating movement introduced into the valve kinematics, for example a manual closing movement. On the detection of such a manual actuation action, the drive assembly is controlled by means of the control arrangement so that the actuation movement is continued in a motorized manner.

In order to avoid, for example, that mechanical vibration effects on the flap are incorrectly detected as an actuation action, a plausibility check is additionally provided for the detection of the actuation action. For this purpose, it is known in one variant to allow the detection of an actuation action only after the expiry of a predetermined period of time after reaching the open position of the flap. This ensures that any vibrations which can be caused by reaching the open position have subsided before the detection of the actuation action takes place.

With the known method, only a low level of safety against incorrect control of the flap can be achieved. For example, with the known method it cannot be prevented that a wind shock acting on the flap in the open position is incorrectly detected as an actuation action, which leads to a control error of the drive arrangement.

The proposed method concerns the operation of a motorized flap arrangement 1 of a motor vehicle 2, wherein the flap arrangement 1 has a flap 4 which is adjustable by means of kinematics 3.

Figure 1:
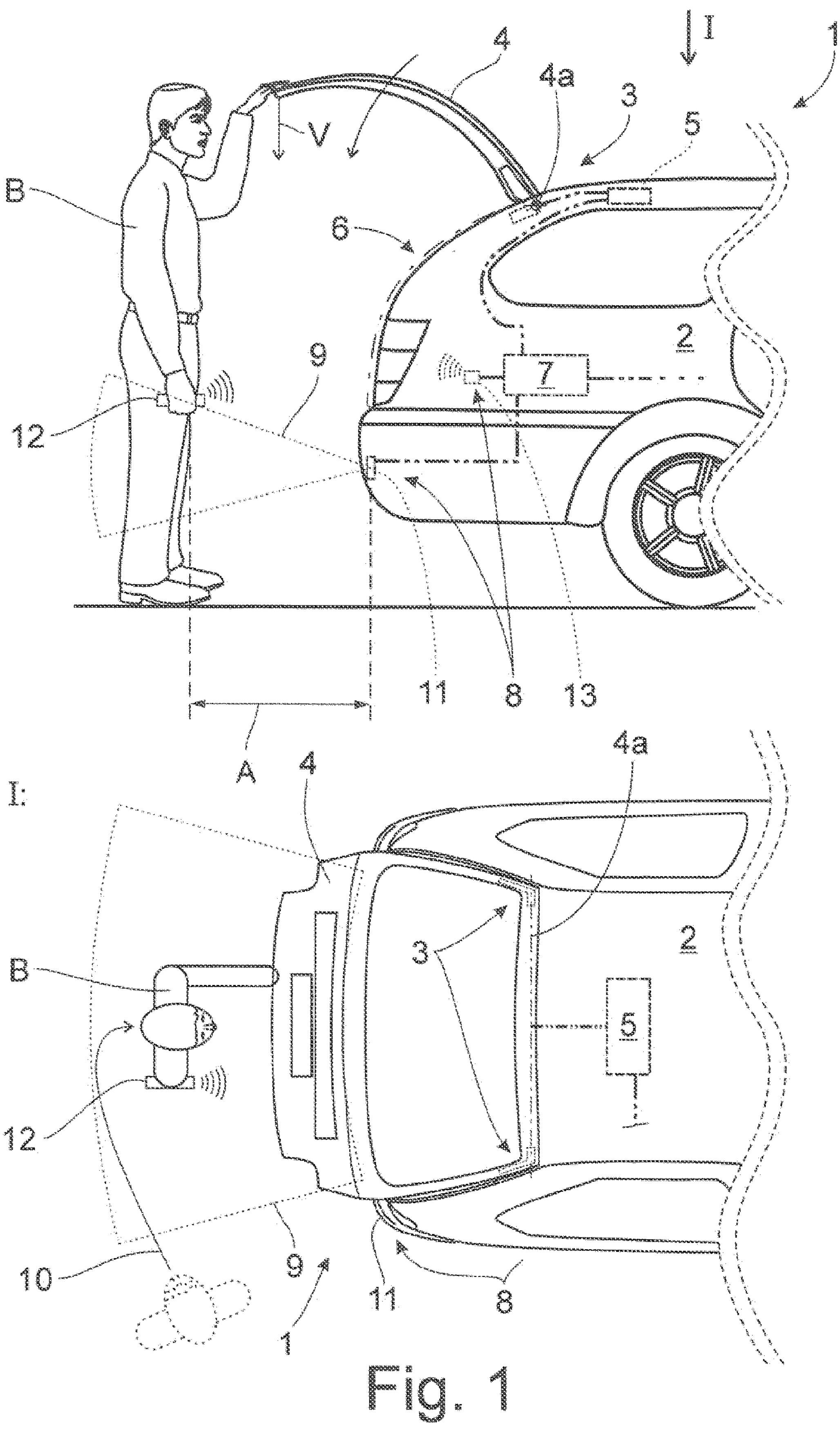
FIG. 1 shows the rear area of a motor vehicle with a proposed flap arrangement for carrying out the proposed method.

The term "motorized flap arrangement" means in the present case that the flap 4 is assigned a drive assembly 5, which allows motorized transpositioning of the flap 4 between the open position shown in FIG. 1 with a solid line and the closed position shown in FIG. 1 with a dashed line as well as from one intermediate position to another intermediate position.

In the present case, the term "flap" must be interpreted broadly. Accordingly, the term includes a tailgate, a trunk lid, a front hood, a door, such as a side or rear door, or the like. A sliding door is also included.

All components which allow the movement of the flap 4 are summarized under the term "flap kinematics". With the exemplary embodiment shown in FIG. 1, the flap kinematics 3 may comprise a hinge arrangement allowing the flap 4 to be pivoted around the flap axis 4*a*.

The drive assembly 5 may have at least one drive, which in turn is equipped with a drive motor and optionally with a downstream feed gear for producing drive movements.

In the illustrated embodiment, the drive assembly 5 is arranged in the area of the upper roof frame of the motor vehicle 2. Alternatively, it may be provided that at least one drive is arranged to the side of the flap opening 6. In the latter case, the drive may be a spindle drive. For construction details regarding such a spindle drive, reference may be made to Applicant's application DE 10 2011 118 353 A1 filed Nov. 14, 2011, which is incorporated by reference herein in its entirety.

The flap arrangement 1 also has a control arrangement 7 for control of the drive assembly 5, such as for the control of the drive motor or the drive motors of the drive assembly 5. The control arrangement 7 can be a flap control unit assigned to the flap 4. In principle, the control arrangement 7 can also be part of a central vehicle controller. The control arrangement 7 may have control electronics for the implementation of the control tasks arising herein.

An actuation action manually introduced into the flap kinematics 3 via the flap 4 in the form of an actuation movement and/or an actuation load is detected by means of the control arrangement 7. The actuation action is therefore actuation of the flap 4, which continues into the flap kinematics 3. The operation of a button or the like arranged on the flap 4 is expressly not included in the predetermined actuation action.

On detection of a predetermined actuation action, the drive assembly 5 is controlled subject to a plausibility check for motorized adjustment of the flap 4. This means that the detection of the predetermined actuation action alone is not sufficient to trigger the control of the drive assembly 5. Rather, a plausibility check must be conducted successfully before the drive assembly 5 is controlled for motorized adjustment of the flap 4. In this case, the plausibility check for detection of the predetermined actuation action may be upstream or downstream. Also a parallel implementation of the detection of the predetermined actuation action and the plausibility check can be advantageous.

After the successful performance of the plausibility check, the drive assembly 5 is controlled by means of the control arrangement 7 for the motorized displacement of the flap 4, such as in the adjustment direction that corresponds to the manual actuation action.

In the context of the plausibility check by means of the control arrangement 7 an environment sensor system 8 of the motor vehicle 2 is checked for the fulfilment of at least one plausibility criterion. Here, the environment sensor system 8 of the motor vehicle 2 is used for the detection of an object, in the present case and may be of an operator B, in the vicinity of the motor vehicle 2, such as of the flap 4. Generally speaking, according to the proposal the plausibility check is therefore based on the detection of an object, such as of the operator B, in the vicinity of the motor vehicle 2, such as of the flap 4.

As an example, a plausibility criterion consists in that an object, in the present case and preferably the operator B, is detected by means of the control arrangement 7 in a predetermined presence area 9 in the vicinity of the motor vehicle 2, such as of the flap 4. For the exemplary embodiment shown in FIG. 1, the presence area 9 is a predetermined region upstream of the flap 4. As an example, a plausibility criterion consists of the fact that the operator B is less than 4 m, may be less than 2 m, distant from the motor vehicle 2 or from the flap 4.

From the representation according to FIG. 1 it is apparent that the probability of a control error is extraordinarily low in the event that the operator B is in the presence range 9 and a predetermined actuation action has been detected.

In order to further reduce the probability of a control error, it may be provided that a predetermined movement 10 of an object, such as the operator B, in the environment of the motor vehicle 2, such as the flap 4, is detected by the control arrangement 7. With the exemplary embodiment illustrated in FIG. 1, the predetermined motion 10 is the approaching movement of the operator B towards the flap 4.

The predetermined actuation action can generally be defined as a manually triggered movement of the flap 4, which has a predetermined movement profile. This may be implemented in control technology in that the predetermined actuation action is defined by at least one operating parameter. This may make it easy to change the definition of the actuation action by modifying the respective actuation parameter, as has been mentioned above. For example, it may be provided that a movement profile corresponding to the actuation action is defined by a number of actuation parameters.

As an example, the actuation action is defined in that the actuation movement as an actuation parameter exceeds or falls below a predetermined limit movement value. For example, the limit movement value may be a predetermined limit velocity and/or a predetermined limit acceleration and/or a specific limit expansion of the actuation movement of the flap.

Figure 2:
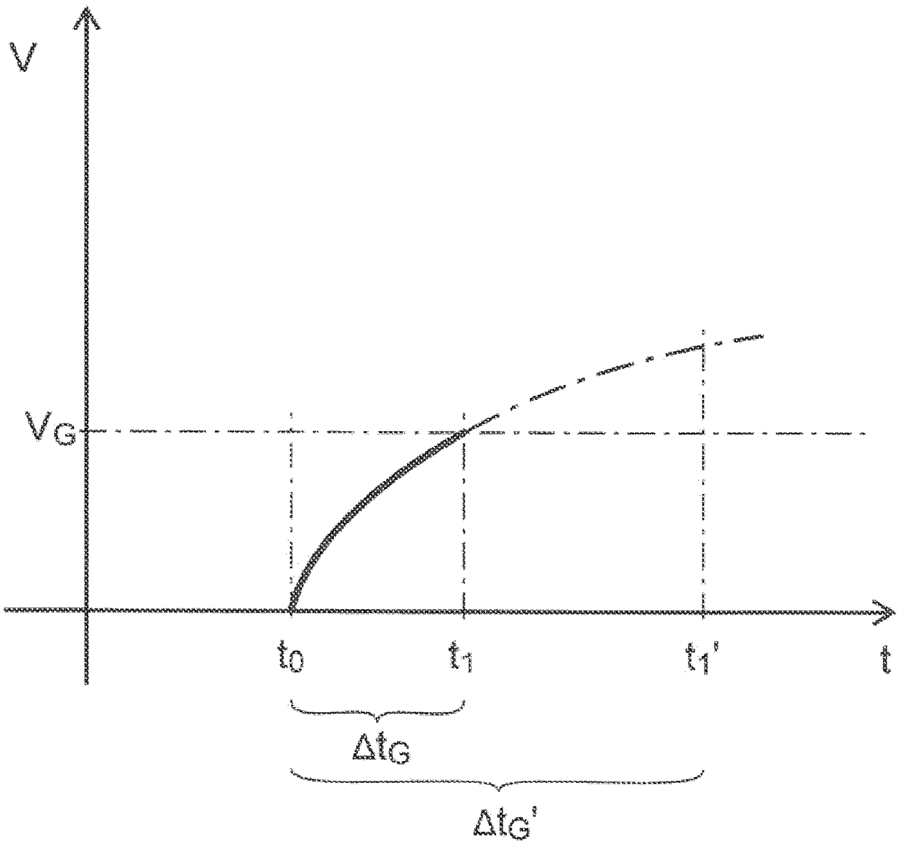
FIG. 2 shows the actuation speed of the flap of the flap arrangement according to FIG. 1 over time in the context of a manual operation.

With the exemplary embodiment shown in FIG. 2, the actuation action is defined in that the flap 4, located in the open position or in an intermediate position, is accelerated starting at time $t_0$ to a limit speed $v_G$, wherein the acceleration may not exceed a limit acceleration $a_G$. According to the representation in FIG. 2, the limit acceleration $a_G$ results to a first approximation from the quotient of the flap speed $v_G$ and the time $\Delta t_G$ required for the acceleration.

Alternatively or additionally, it may also be provided that the operation is defined in that the actuation load, i.e. the force introduced into the valve kinematics 3 or the torque introduced into the flap kinematics 3 as the actuation parameter exceeds or falls below a predetermined limit load value. This may be advantageous, for example, if the drive assembly 5 is self-locking, so that a manual adjustment of the flap 4 is blocked while the drive assembly 5 is driven back. In this case, the actuation action can be detected in that the load situation at the flap 4 is detected without the need for a flap movement.

Different detection concepts may be used for the detection of the actuation action. In one or more embodiments, the actuation action may be detected by the control arrangement 7 by means of a motion sensor assigned to the flap 4 and/or the drive assembly 5. As an example, the motion sensor is assigned to the drive assembly 5, such as to a drive motor of the drive assembly 5. Alternatively or additionally, the actuation action can also be detected by means of the control arrangement 7 based on an electric drive current associated with the drive assembly 5. In one or more embodiments, this is the motor current of a drive motor assigned to the drive assembly 5, so that sensorless and thus cost-effective detection is possible. The same advantage can be achieved in that the actuation action is detected by the control arrangement 7 based on a drive voltage associated with the drive assembly 5, such as a generator voltage of an electric drive motor assigned to the drive assembly 5.

Depending on the equipment of the motor vehicle 2, two different advantageous variants are conceivable for the design of the environment sensor system 8. In a first variant shown in FIG. 1, the environment sensor system 8 has a proximity sensor 11 for the detection of the operator B. The proximity sensor 11 may be arranged on or in a body component of the motor vehicle 2, such as in a bumper of the motor vehicle 2.

In the illustrated exemplary embodiment, the distance of the operator B from the motor vehicle 2, such as from the flap 4, can be detected by means of the proximity sensor 11. As an example, the proximity sensor 11 is a capacitive proximity sensor, which can also be used in the context of gesture recognition, such as for the recognition of a foot movement or the like. It is also conceivable that the environment sensor system 8 has an ultrasonic sensor, which may be provided depending on the equipment of the motor vehicle 2 for the function of a parking aid. Basically, the environment sensor system 8 can also have a radar sensor or the like.

Furthermore, it may be advantageous that the environment sensor system 8 has an image generating sensor, which may be a 2D camera and/or a 3D camera. Such a sensor may also be provided within the scope of the function of a reversing camera.

Finally, it is conceivable that the environment sensor system 8 has a position sensor for detecting the position of a radio key carried by the operator B based on a radio connection to the control arrangement 7. The detection of the position of the radio key 12 is based here on the distance of the radio key 12 from a transceiver unit 13 of the control arrangement 7.

It has already been pointed out that for the proposed solution an environment sensor system 8 may be used, which may be provided anyway depending on the equipment of the vehicle 2. As an example, it may be provided that the environment sensor system 8 is additionally used for the function of a parking aid, as has been addressed in connection with the ultrasonic sensor. Alternatively or additionally, it may be provided that the environment sensor system 8 is additionally used for the function of an operating event detection, as has been explained in connection with the capacitive proximity sensor. Further alternatively or additionally, it may be provided that the environment sensor system 8 is additionally used for the function of an access authorization test, as has been explained in connection with the radio connection between a radio key 12 and the control arrangement 7. Such a double use of the respective environment sensor system 8 leads not only to a high level of compactness, but also to a particularly cost-effective implementation.

In the event that plausibility checks with a negative result accumulate, even though the predetermined actuation action is considered to be detected, an adjustment of the definition of the actuation action is required. For this purpose, a learning routine is provided, in the context of which a change of at least one actuation parameter is carried out depending on the respective result of the plausibility check over a predetermined number of recorded actuation actions.

If, for example, the limit acceleration $a_G$ is set too large, mechanical vibrations on the flap 4 with comparatively high vibration frequency are also detected as actuation actions. The resulting accumulation of plausibility checks with negative results may lead, in the context of the learning routine, to the limit acceleration $a_G$ being reduced to the limit acceleration $a'_G$. Thus, all high-frequency vibrations of the flap 4 are filtered out in such a way that these vibrations are not detected as a predetermined actuation action. Other variants for the adaptation of the definition of the actuation action are conceivable.

According to one or more embodiments, the control arrangement 7, which is set up for the implementation of the proposed method, is claimed as such. As an example, software is running on the control arrangement 7 which is designed for the implementation of the proposed method. Reference may be made to all the comments on the proposed method.

According to a further teaching, which also has independent importance, the flap arrangement 1 with the flap 4 adjustable by means of the flap kinematics 3 is claimed as such, wherein the flap arrangement 1 has a drive assembly 5 assigned to the flap 4 and a proposed control arrangement. In this respect, too, reference may be made to all the comments on the proposed method.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

1 flap arrangement
2 motor vehicle
3 flap kinematics
4 flap
5 drive assembly
6 flap opening
7 control arrangement
8 environment sensor system
9 presence area
10 movement
11 proximity sensor
12 operator
13 transceiver unit
**4*a*** flap axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method of operating a motorized flap arrangement of a motor vehicle, wherein the flap arrangement includes a flap, a drive assembly, an environment sensor, and a control arrangement, wherein the drive assembly is configured to adjust the flap and the control arrangement is configured to control the drive assembly, the method comprising:

detecting, by the control arrangement, a manually introduced actuation of the flap in a form of a predetermined actuation action, wherein the predetermined actuation action includes at least one of an actuation movement and an actuation load, wherein the predetermined actuation action is detected by a motion sensor assigned to the flap, detected by the control arrangement based on an electric drive current associated with the drive assembly, or based on a drive voltage associated with the drive assembly;

performing, by the control arrangement, a plausibility check, wherein the environment sensor is configured for the detection of an object in a vicinity of the motor vehicle is checked for fulfillment of at least one plausibility criterion, wherein the at least one plausibility criterion is fulfilled when an operator is detected in a predetermined presence area in the vicinity of the motor vehicle; and controlling, by the control arrangement, the drive assembly for motorized adjustment of the flap in response to the detection of the manually introduced actuation and the fulfillment of the at least one plausibility criterion.

2. The method of claim 1, wherein the plausibility criterion includes detecting an object in a predetermined presence region associated with the motor vehicle by the control arrangement.

3. The method of claim 1, wherein the plausibility criterion includes detecting, by the control arrangement, a predetermined movement of an object in the vicinity of the flap.

4. The method of claim 1, wherein the predetermined actuation action is defined by at least one operating parameter.

5. The method of claim 4, wherein the predetermined actuation action is defined in that the actuation movement as an actuation control parameter exceeds or falls below a predetermined limit movement value.

6. The method of claim 4, wherein the actuation load is based on an actuation parameter exceeding or falling below a predetermined limit load value.

7. The method of claim 1, wherein the environment sensor includes a proximity sensor for detecting the operator.

8. The method of claim 1, wherein the environment sensor includes an imaging sensor.

9. The method of claim 1, wherein the environment sensor includes a position sensor for detecting the position of a radio key based on a radio connection.

10. The method of claim 1 further comprising providing a parking aid sensor configured to cooperate with the environment sensor.

11. The method of claim 1 further comprising changing at least one actuation parameter during a learning routine based on a respective result of the plausibility check over a predetermined number of detected actuation actions.

12. The method of claim 1 further comprising providing operator event detection with the environment sensor.

13. A flap arrangement comprising:

an adjustable flap;

a drive assembly associated with the flap; and a control arrangement programmed to:

detect, by the control arrangement, a manually introduced actuation of the flap, wherein the manually introduced actuation includes at least one of an actuation movement or an actuation load, wherein the manually introduced actuation is detected by a motion sensor assigned to the flap, detected by the control arrangement based on an electric drive current associated with the drive assembly, or based on a drive voltage associated with the drive assembly, and perform a plausibility check, in which the control arrangement checks an environment sensor of a motor vehicle configured for detection of an object in a vicinity of the motor vehicle for fulfillment of at least one plausibility criterion, wherein the at least one plausibility criterion is fulfilled when an operator is detected in a predetermined presence area in the vicinity of the motor vehicle, and control the drive assembly for motorized adjustment of the flap in response to the detection of the manually introduced actuation and the fulfillment of the at least one plausibility criterion.

14. The flap arrangement of claim 13, wherein the at least one plausibility criterion includes detecting an object in a predetermined presence region associated with the motor vehicle by the control arrangement.

15. The flap arrangement of claim 13, wherein the at least one plausibility criterion includes detecting, by the control arrangement, a predetermined movement of an object in the vicinity of the flap.

16. The flap arrangement of claim 13, wherein the manually introduced actuation is defined by at least one operating parameter.

17. A flap arrangement of a motor vehicle comprising:

a flap;

a drive assembly configured to actuate the flap;

an environment sensor configured to sense an operator in a vicinity of the flap; and a control arrangement programmed to, in response to the environment sensor indicating an operator within a threshold distance of the flap and the flap being manually actuated in a first direction, actuate the flap in the first direction via the drive assembly; and a motion sensor configured to sense motion of the flap, wherein the control arrangement is further programmed to detect manual actuation of the flap based on data from the motion sensor, and wherein the control arrangement is further configured to perform, a plausibility check, wherein the environment sensor configured for the detection of an object in the vicinity of the motor vehicle is checked for fulfillment of at least one plausibility criterion, wherein the at least one plausibility criterion is fulfilled when the operator is detected in a predetermined presence area in the vicinity of the motor vehicle.

18. The flap arrangement of claim 17, wherein the actuation of the flap in the first direction via the drive assembly is further in response to the environment sensor detecting movement of the operator.

* * * * *